(12) United States Patent
Oyama et al.

(10) Patent No.: US 6,202,697 B1
(45) Date of Patent: Mar. 20, 2001

(54) PROPORTIONAL PRESSURE CONTROL VALVE

(75) Inventors: Hitoshi Oyama; Koichi Hashida, both of Itami (JP)

(73) Assignee: Sumitomo Electric Industries, Inc., Osaka (JP)

(*) Notice: Subject to any disclaimer, the term of this patent is extended or adjusted under 35 U.S.C. 154(b) by 0 days.

(21) Appl. No.: 09/423,300
(22) PCT Filed: Mar. 23, 1998
(86) PCT No.: PCT/JP98/01290
  § 371 Date: Nov. 9, 1999
  § 102(e) Date: Nov. 9, 1999
(87) PCT Pub. No.: WO98/53235
  PCT Pub. Date: Nov. 26, 1998

(30) Foreign Application Priority Data

May 23, 1997 (JP) .................................................. 9-133450

(51) Int. Cl.[7] .................................................. F15B 13/044
(52) U.S. Cl. .................. 137/625.65; 251/129.02; 251/129.08
(58) Field of Search ................. 137/625.65; 251/129.02, 251/129.08

(56) References Cited

U.S. PATENT DOCUMENTS

| | | | |
|---|---|---|---|
| 5,036,885 | * 8/1991 | Miura | 137/625.65 |
| 5,186,093 | * 2/1993 | Kervagoret | 137/625.65 X |
| 5,571,248 | * 11/1996 | Seetharaman et al. | 137/625.65 |
| 5,577,534 | * 11/1996 | Ward | 137/625.65 |
| 5,894,860 | * 4/1999 | Baldauf et al. | 137/625.65 |

FOREIGN PATENT DOCUMENTS

| | | |
|---|---|---|
| 1-261581 | 10/1989 | (JP) . |
| 7-6579 | 1/1995 | (JP) . |

OTHER PUBLICATIONS

English language abstract of JP 1–261581.

* cited by examiner

Primary Examiner—Gerald A. Michalsky
(74) Attorney, Agent, or Firm—Greenblum & Bernstein, P.L.C.

(57) ABSTRACT

A proportional pressure control valve of the type in which a spool is driven by an electromagnet to control the load pressure to a value corresponding to the electromagnet energizing current is provided to simplify and reduce the cost of such valve. The number of springs has been reduced to one by biasing the spool with a spring through an actuating element of the electromagnet. Also, by providing a reaction force piston near a low-pressure pressure chamber, the need to form a hole in the actuator at a functionally important portion has been eliminated. Furthermore, arrangement is such that the load pressure acts on the spool in the same direction with the force of the electromagnet to supplement it. Further, the actuating element is formed integrally with the spool to eliminate any sliding portions from the actuating element, and a gap is formed between the actuation element and the member surrounding the actuating element to reduce the sliding resistance thereof.

1 Claim, 1 Drawing Sheet

PROPORTIONAL PRESSURE CONTROL VALVE

TECHNICAL FIELD

This invention relates to a proportional pressure control valve used in a power steering, transmission or brake system for automobiles.

BACKGROUND ART

A proportional pressure control valve is known in which a spool is moved to a position corresponding to a magnetic force for changeover of connection of a load port to a high pressure source port and a low pressure source port and for adjustment of degree of opening of variable throttles for communication of the load port with the high pressure source port and the low pressure source port, thereby controlling the pressure at the load port (hereinafter referred to as "load pressure"), e.g. from unexamined Japanese patent publication 1-261581 or unexamined Japanese utility model publication 7-6579.

In the control valve of the former publication, the spool is biased from both sides by springs to keep a neutral position, and the load pressure is applied to one end of the spool, and a thrust produced by a proportional solenoid is applied to its other end. Also, in order to case a plunger (actuating element) of the proportional solenoid to follow the spool, it is pressed against the other end of the spool by a spring.

On the other hand, in the fluid pressure control valve of the latter publication, in a normal state, an output port is in communication with a drain port. When a plunger (actuating element) of a pressure-increasing solenoid is attracted by an electromagnet, the spool connected to the plunger moves in such a direction that the output fluid pressure increases. Also, a reaction force piston for applying a returning force to the spool using the output fluid pressure is inserted in one end of the spool on the side where the pressure-increasing solenoid is provided, and further the plunger of the pressure-increasing solenoid is supported by a bush for guiding its movement.

The control valve of the former publication needs three springs, so that the structure is complicated and the cost is high due to increase in the number of parts.

Also, in the fluid pressure control valve of the latter publication, since the reaction force piston inserted in the spool is provided on the same side as the plunger (actuating element) of the pressure-increasing solenoid fitted on the spool, it is necessary to form a hole (oil path) in the plunger at the portion where the magnetic flux density of the plunger portion becomes high so that no pressure difference is produced between both ends of the plunger. Thus, the volume of the portion in question decreases. This results in the loss of power of the electromagnet.

Also, in either control valve, because the plunger of the soleniod is supported by a bush which serves as a slide guide, the slide resistance of the plunger adds to the slide resistance of the spool, thus affecting the movement of the spool unfavorably.

Further, in either control valve, because the reaction force produced by the reaction force piston (referred to as "slide pin" in the former publication 1-2615819) is applied to the spool in such a direction against the spool driving force from the solenoid, extra power is needed for the electromagnet, so that the power consumption increases.

An object of this invention is to solve these problems.

DISCLOSURE OF THE INVENTION

The proportional pressure control valve of this invention comprises.

a casing formed with a spool guide hole, a high pressure source port, a low pressure source port and a load port, the ports each opening in the spool guide hole at intermediate portions, and first and second low-pressure pressure chambers communicating with the low pressure source port;

a spool liquid-tightly and slidably inserted in the spool guide hole with one end thereof protruding into the first low-pressure pressure chamber and the other end into the second low-pressure pressure chamber and having a load pressure chamber in communication with the load port;

a reaction force piston slidably inserted in the spool with one end thereof protruding into the load pressure chamber in the spool, and the other end thereof protruding into the second low-pressure pressure chamber and abutting the casing;

a spring for biassing the spool toward the second low-pressure pressure chamber; and an electromagnet having an actuating element provided in the first low-pressure pressure chamber for pulling the spool against the force of the spring;

the high pressure source port, the low pressure source port and the load port being positioned such that the load port does not communicate with the low pressure source port and the load port communicates with the high pressure source port when the spool is at an extreme end biassed by the spring, wherein the spool is moved to a position determined by the magnetic attraction force of the electromagnet to change over the communication between the load port and the high pressure source port and the low pressure source port and adjust the degree of opening of a variable throttle through which the load port communicates with the high pressure source port or the low pressure source port.

In this proportional pressure control valve, if the actuating element of the electromagnet is formed integrally with the spool, or a separate actuating element is fixed to the spool through a fixed connecting portion, it is possible to omit a slide guide for the actuating element and thus to form a gap larger than a gap designed as a slide clearance between the actuating element and members arranged around the actuating element (which are below-described sleeve and part of a lid) is formed therebetween. If the gap around the actuating element is larger than the slide clearance, the actuator and the members provided therearound will not contact with each other, thus preventing decrease in control accuracy and response. Also, by omitting the slide guide, manufacture is easier.

In this invention, since the spool is biased toward the second low-pressure pressure chamber by a single spring together with the actuating element of the electromagnet, the number of parts decreases and the structure becomes simple.

Also, because the reaction force piston is provided near the second low-pressure pressure chamber, it is possible to reduce the loss of force of the electromagnet by forming a hole as an oil path in the actuating element of the electromagnet in e.g. a core portion where magnetic flux scarcely passes.

Further, because the reaction force piston is provided near the second low-pressure pressure chamber, the direction in which the spool is pushed by the load pressure and the direction in which the spool is pulled by the electromagnet coincide with each other, so that the force of the electromagnet can be saved.

Although the control valve will function normally even if a structure in which the actuating element of the electromagnet is made separate and pressed against the spool by a spring is employed (when the actuating element is pulled by the force of the electromagnet, the spool follows the actuating element under the load pressure). But by forming the actuating element integral with the spool, it is possible to simplify manufacture and make it easier for the spool to move by omitting the slide guide of the actuating element.

BEST MODE FOR EMBODYING THE INVENTION

Figure 1:
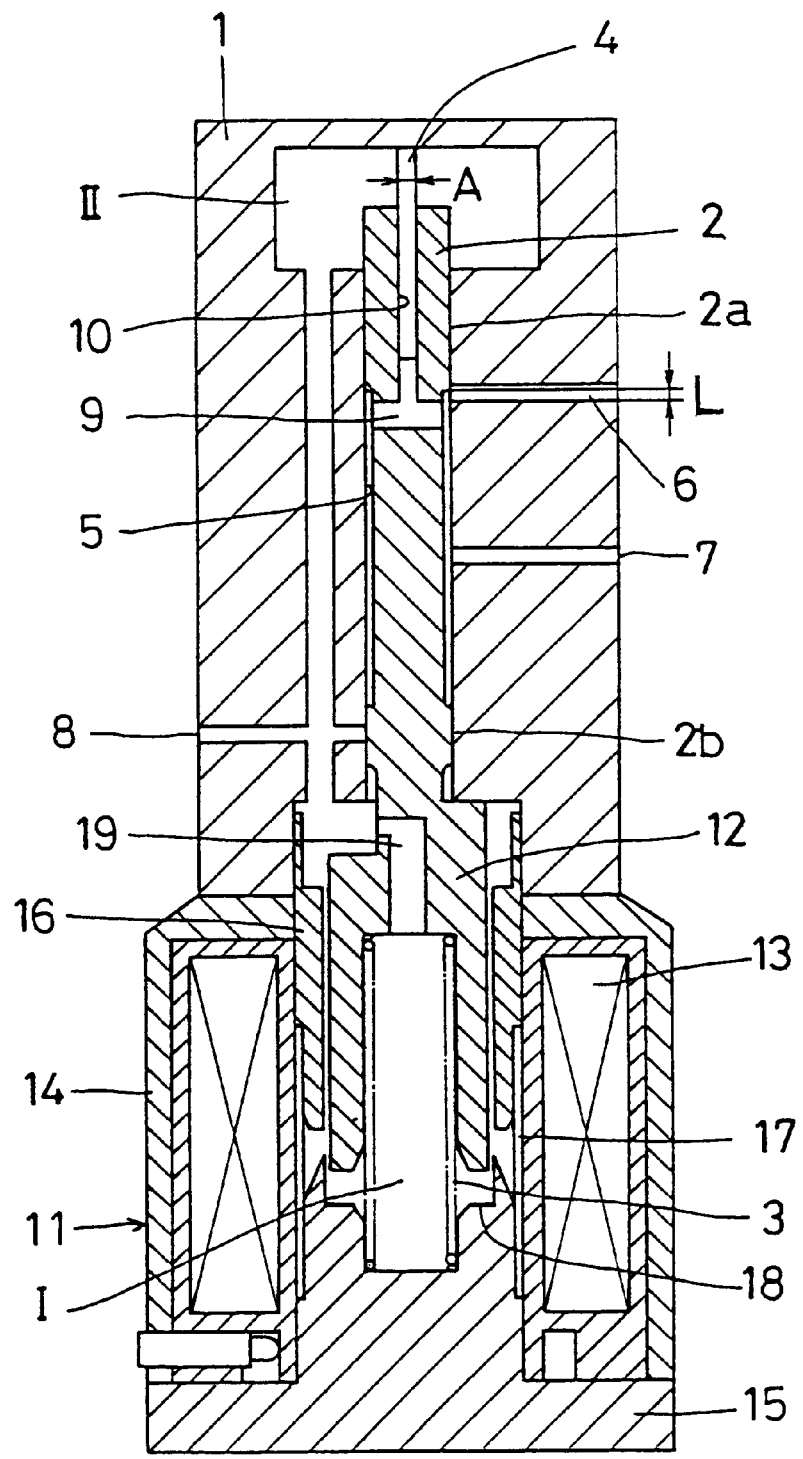
FIG. 1 is a sectional view showing an embodiment of a proportional pressure control valve according to this invention.

In FIG. 1, one embodiment of this invention is shown. This proportional pressure control valve is made up of a casing 1, a spool 2, a spring 3 for biassing the spool, a reaction force piston 4, and an electromagnet 11 having an actuating element (or armature) 12.

The casing 1 has a spool guide hole 5, a high pressure source port 6 connected to a fluid pressure source, a load port 7 connected to a load (not shown) such as a brake cylinder, a low pressure source port 8 connected to e.g. a tank (not shown), and low-pressure pressure chambers I and II each communicating with the low pressure source port 8. The high pressure source port 6, load port 7 and low pressure source port 8 are open at longitudinal intermediate portions of the spool guide hole 5.

The spool 2 is slidably inserted in the spool guide hole 5. Clearances between land portions 2a, 2b on the outer periphery of the spool at both ends are made as small as possible to reduce fluid leakage within a range that will not hinder sliding of the spool. Also, the spool 2 has a load pressure chamber 9 always communicating with the load port 7, and a hole 10 leading from the chamber 9 to the low-pressure pressure chamber II.

The reaction force piston 4 (which is a pin in the embodiment) is inserted in the hole 10 of the spool 2, and its one end protruding into the low-pressure pressure chamber II is in abutment with the casing 1.

The electromagnet 11 is made up of an actuating element 12, a coil 13, a housing 14, a lid 15, a sleeve 16 coupling the housing 14 to the casing 1, and a seal member 17 of a nonmagnetizable material. Numeral 18 is a nonmagnetizable stopper provided on the lid 15 to restrict the movement of the actuating element 12. In the electromagnet 11, the housing 14, lid 15 and sleeve 16 form a magnetic circuit that applies magnetic attraction force to the actuating element 12 to pull it against the force of the spring 3.

The spring 3 biases the spool 2 toward the low-pressure pressure chamber II through the actuating element 12. When the spool 2 is in the illustrated position biassed by the force of the spring 3, the load port 7 is brought into communication with the high pressure source port 6, and out of communication with the low pressure source port 8, so that the load pressure rises under the pressure from the high pressure source port 6.

Also, when the spool 2 moves by a distance L toward the low-pressure pressure chamber I from the illustrated position, the load port 7 is isolated both from the high pressure source port 6 and the low-pressure source port 8, so that the load pressure is maintained. When the spool 2 moves further in the same direction, the load port 7 is isolated from the high pressure source port 6 and brought into communication with the low pressure source port 8, so that the load pressure drops.

A variable throttle is formed between the land portion 2a of the spool 2 and the edge of the high pressure source port 6 when the load port 7 is brought into communication with the high pressure source port 6. Another variable throttle is formed between the land portion 2b of the spool 2 and the edge of the low pressure source port 8 when the load port 7 is brought into communication with the low pressure source port 8. The opening of such variable throttles change as the spool 2 moves. By the action of the variable throttles, the amounts of fluid introduced into and discharged through the load port 7 are controlled.

The spool 2 receives a downward force which is equal to the load pressure Pc multiplied by the sectional area A of the reaction force piston 4. Thus, when the load pressure increases by the supply of pressure fluid from the high pressure source port 6 until the force (Pc×A) overcomes the force of the spring 3, even if the electromagnet 11 is off, the spool 2 begins to move toward the low-pressure pressure chamber I until it reaches a position where the following equation is met:

$$Pc \times A = \text{force of spring} \tag{Eq. 1}$$

When a force produced by the electromagnet 11 is added, the following equation holds:

$$Pc \times A + (\text{force of electromagnet}) = \text{force of spring} \tag{Eq. 2}$$

The force produced by the electromagnet 11 is proportional to the square of the current flowing through the coil 13. That is, the relation $Pc \, I^2$ is met. It is thus possible to control the load pressure Pc to any desired value by adjusting the current.

A pressure control valve using a spool cannot completely eliminates fluid leakage through clearances formed around the spool. But any shift in pressure balance due to fluid leakage is corrected because the spool 2 moves automatically in the pressure-increasing or decreasing direction until the equation 2) is met.

In the illustrated pressure control valve, the actuating element 12 is integral with and supported by the spool 2, and gaps are formed between the actuating element 12 and the sleeve 16 provided therearound and part of the lid 15 so as to prevent contact with each other. Thus, the sliding resistance applied to the spool is only the resistance produced at its own sliding portion (which is extremely small because the spool is machined to high precision), so that the spool moves smoothly.

Further, although a hole 19 as an oil path is formed in the actuating element 12, there will be no loss of power of the electromagnet 11 because this portion is not an important portion as a magnetic circuit.

The proportional pressure control valve of this invention needs only one spring, so that it is possible to simplify the structure and reduce the cost.

Also, since the reaction force pin is provided at the side of the low-pressure pressure chamber II, there is no need to form a hole as an oil path in a functionally important portion of the actuating element of the electromagnet. This prevents loss of power of the electromagnet.

Further, since the reaction force piston is provided at the above-mentioned position, the load pressure acts on the spool in such a direction as to supplement the force of the electromagnet, so that it is possible to set the force of the electromagnet to a lower value and to reduce the consumed power.

Besides, in the arrangement in which the spool and the actuating element are integrally formed to eliminate sliding portions of the actuating element, portions requiring high-precision machining decrease, so that manufacture is easy. Also, the pressure control valve responds sharply and quickly to the difference in force acting on the spool, so that its control accuracy improves.

What is claimed is:

1. A proportional pressure control valve comprising:

a casing formed with a spool guide hole, a high pressure source port, a low pressure source port and a load port, said ports each opening in said spool guide hole at intermediate portions, and first and second low-pressure pressure chambers communicating with said low pressure source port;

a spool liquid-tightly and slidably inserted in said spool guide hole with one end thereof protruding into said first low-pressure pressure chamber and the other end into said second low-pressure pressure chamber and having a load pressure chamber in communication with said load port;

a reaction force piston slidably inserted in said spool with one end thereof protruding into said load pressure chamber in said spool, and the other end thereof protruding into said second low-pressure pressure chamber and abutting said casing;

a spring for biasing said spool toward said second low-pressure pressure chamber; and an electromagnet having an actuating element provided in said first low-pressure pressure chamber for pulling said spool against the force of said spring, wherein said actuating element of said electromagnet is one of formed integrally with said spool and formed as a separate member fixed to said spool by a connecting portion, and wherein a gap is formed between said actuating element and a member surrounding said actuating element to keep said actuating element out of contact with said member surrounding said actuating element;

said high pressure source port, said low pressure source port and said load port being positioned such that said load port does not communicate with said low pressure source port and said load port communicates with said high pressure source port when said spool is at an extreme end biased by said spring, wherein said spool is moved to a position determined by the magnetic attraction force of said electromagnet to change over the communication between said load port and said high pressure source port and said low pressure source port and to adjust the degree of opening of a variable throttle through which said load port communicates with one of said high pressure source port and said low pressure source port.

* * * * *

UNITED STATES PATENT AND TRADEMARK OFFICE
CERTIFICATE OF CORRECTION

PATENT NO. : 6,202,697 B1
DATED : March 20, 2001
INVENTOR(S) : H. Oyama et al.

It is certified that error appears in the above-identified patent and that said Letters Patent is hereby corrected as shown below:

<u>Title page,</u>
Item [73], Assignee, "Inc." should be -- Ltd. --.

Signed and Sealed this

Fifth Day of February, 2002

Attest:

Attesting Officer

JAMES E. ROGAN
Director of the United States Patent and Trademark Office